United States Patent [19]
Yano

[11] Patent Number: 4,651,244
[45] Date of Patent: Mar. 17, 1987

[54] DEVICE COMPRISING A CAM FOR COUPLING/DECOUPLING MAGNETIC HEADS RELATIVE TO A FLEXIBLE DISK

[75] Inventor: Minoru Yano, Tokyo, Japan

[73] Assignee: Nippon Electric Co., Ltd., Japan

[21] Appl. No.: 433,385

[22] Filed: Oct. 8, 1982

[30] Foreign Application Priority Data

Oct. 9, 1981 [JP] Japan .................. 56-161197

[51] Int. Cl.⁴ .................... G11B 5/54; G11B 5/016
[52] U.S. Cl. ................................ 360/105; 360/99
[58] Field of Search ............. 360/105, 97, 98, 99, 360/106

[56] References Cited

U.S. PATENT DOCUMENTS

| | | | |
|---|---|---|---|
| 3,593,327 | 7/1971 | Shill | 360/97 |
| 3,797,033 | 3/1974 | Prieur | 360/98 |
| 3,815,150 | 6/1974 | Stoddard et al. | 360/97 |
| 3,882,541 | 5/1975 | Ghose et al. | 360/78 |
| 4,058,844 | 11/1977 | Dirks | 360/106 |
| 4,089,029 | 5/1978 | Castrodale et al. | 360/99 |
| 4,216,510 | 8/1980 | Manzke et al. | 360/99 |
| 4,253,125 | 2/1981 | Kanamuller | 360/99 |

Primary Examiner—John H. Wolff
Assistant Examiner—Matthew J. Bussan
Attorney, Agent, or Firm—Laff, Whitesel, Conte & Saret

[57] ABSTRACT

A flexible disk device, in which a handle member is manually operated to move a holding asembly which either holds a flexible disk in an operating position or releases the disk, for removal. A cam selectively couples a pair of magnetic heads simultaneously to engage the disk and to hold them in position. The cam also decouples the heads from the disk. The cam may comprise first and second cam sections, which are reversibly rotatable on both sides of the disk when it is held in an operating position, respectively. In this event, it is preferred to make a head withdrawing assembly to forcibly rotate the cam to withdraw the heads from the coupled state whenever the handle member is actuated to release the disk. The head withdrawing assembly may comprise a protrusion attached to the cam and an arm attached to the handle member which do not engage each other to leave the cam freely and reversibly rotatable when the disk is held in position. The arm pushes the protrusion to forcibly rotate the cam whenever the handle member is actuated to release the disk.

11 Claims, 9 Drawing Figures

DEVICE COMPRISING A CAM FOR COUPLING/DECOUPLING MAGNETIC HEADS RELATIVE TO A FLEXIBLE DISK

BACKGROUND OF THE INVENTION

This invention relates to a flexible disk device for operatively dealing with a flexible or floppy disk.

Flexible disks are for use in a data processing device, which may herein be an office computer, a personal computer, a word processor, or a like device. Each flexible disk has a pair of principal surfaces. Each principal surface is used in retrievably storing data. A flexible disk, usually about 20 cm in diameter, is capable of memorizing the data up to one megabits.

As will later be described in detail with reference to a few of about ten figures of the accompanying drawing, a flexible disk device comprises a holding assembly for releasably holding a flexible disk in position, a handle or door member manually operable to make the holding assembly hold and release the disk, a carriage controllably movable along a radius of the disk held in position, a pair of magnetic heads in alignment with each other and adjacent to the respective principal surfaces of the held disk, a pair of head holders for uniting the heads to the carriage, and a mechanism for moving or driving the heads selectively nearer to and farther from each other to couple and decouple the heads relative to the held disk. The handle member is normally put in a rest position of making the holding assembly hold a flexible disk in position. When operated to an actuated position, the handle member makes the holding assembly release the disk. The holding assembly is furthermore for rotating the thereby held disk on a disk axis so that the heads, when coupled to the disk, may run along a pair of tracks on the respective principal surfaces.

On dealing with the data, namely, on writing new data along a track on a selected one of the principal surfaces of a flexible disk, retrieving the memorized data, or rewriting such data, the disk under consideration is put into the flexible disk device to be held in position by the holding asembly. The carriage is controlled to place the heads in alignment with the track in question. The mechanism is put into operation to couple the heads to the respective principal surfaces. When thus coupled to the disk, the heads are ordinarily brought into contact with the respective principal surfaces. In other words, the disk is loaded with the heads.

In a conventional flexible disk device, a complicated mechanism is indispensable in order to simultaneously couple the magnetic heads to the respective principal surfaces of a flexible disk held in position and to simultaneously decouple the heads from the disk. When driven towards the respective principal surfaces, the heads are inevitably accelerated. It has therefore been mandatory that the mechanism is made to comprise dampers for reducing the impact of collision of the respective heads to the disk. The mechanism is thereby rendered much complicated and accordingly expensive. Moreover, it has been time consuming on manufacturing such flexible disk devices to adjust the mechanism for simultaneous drive of the heads.

It may nevertheless happen that the handle member is inadvertently actuated from the rest position towards the actuated position during the time that the magnetic heads are coupled to a flexible disk held in position. The holding assembly tends to release the disk even when the assembly is still rotating the disk on the disk axis. It results under the circumstances that a damage is caused to the disk and to the heads.

SUMMARY OF THE INVENTION

It is therefore a principal object of the present invention to provide a flexible disk device, of which component parts are neither much complicated nor too expensive.

It is another principal object of this invention to provide a flexible disk device of the type described, which is readily manufactured without time consuming adjustment of the component parts.

It is still another principal object of this invention to provide a flexible disk device of the type described, in which a pair of magnetic heads are continuously decelerated on coming into sliding contact with a flexible disk held in the device.

It is yet another principal object of this invention to provide a flexible disk device of the type described, which comprises an ingeinous mechanism for simultaneously coupling the magnetic heads to the respective principal surfaces of the disk held in position and to simultaneously decouple the heads from the disk.

It is an additional object of this invention to provide a flexible disk device of the type described, in which the heads are forcibly withdrawn or retracted from the disk held in position whenever the device is caused to release the disk.

It is another additional object of this invention to provide a flexible disk device of the type described, in which a handle or door member for use in making the device selectively hold and release the disk is skillfully coupled to the ingenious mechanism to forcibly withdraw the heads from the disk whenever the handle member is inadvertently actuated.

According to this invention, there is provided a flexible disk device which has a predetermined plane having first and second sides and which comprises: holding means for releasably holding a flexible disk having a pair of principal surfaces with the principal surfaces positioned on the first and the second sides, respectively; a handle member which is coupled to the holding means and is manually operable between first and second operated positions to make the holding means hold and release the flexible disk when put in the first and the second operated positions, respectively; first and second magnetic heads in alignment with each other on the first and the second sides, respectively; first and second head holders carrying the first and the second magnetic heads, respectively; and a cam having a cam surface between the first and the second head holders and being rotatable selectively from a first angular position to a second angular position and from the second angular position to the first angular position on an axis of rotation lying on the predetermined plane. The cam surface is for making the first and the second head holeders simultaneously bring the first and the second magnetic heads into contact with the respective principal surfaces of the flexible disk held by the holding means and simultaneously withdraw the first and the second magnetic heads away from the predetermined plane whenever the cam is put in the first and the second angular positions, respectively.

According to a preferred aspect of this invention, the cam surface is divided into first and second cam surfaces. The cam comprises: a cam stem which is offset from the flexible disk held by the holding means and is rotatable on the axis of rotation selectively from the first angular position to the second angular position forwardly along a predetermined path and from the second angular position to the first angular position reversedly along the predetermined path; and first and second cam sections having the first and the second cam surfaces, respectively, and being integrally attached to the cam stem to be reversibly rotatable around the axis of rotation only on the first and the second sides, respectively, when the cam stem is rotated between the first and the second angular positions. The first and the second cam surfaces are shaped to make the first and the second head holders simultaneously bring the first and the second magnetic heads with a decreasing speed into contact with the respective principal surfaces of the flexible disk held by the holding means.

It is more preferred that a flexible disk device according to the above-mentioned preferred aspect of this invention further comprises head withdrawing means coupled to the handle member on the first side and to the first cam section so as to leave the cam stem freely reversibly rotatable between the first and the second angular positions when the handle member is put in the first operated position and so as to forcibly rotate the cam stem through the first cam section from the first angular position towards the second angular position thereby to make the first and the second head holders simultaneously withdraw the first and the second magnetic heads away from the predetermined plane whenever the handle member is moved from the first operated position towards the second operated position.

DESCRIPTION OF THE PREFERRED EMBODIMENTS

Figure 1:
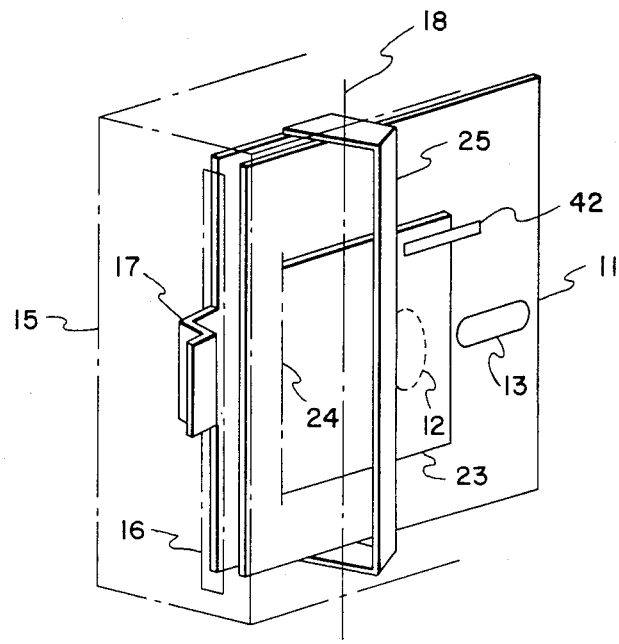
FIG. 1 schematically shows a perspective view of a flexible disk device according to an embodiment of the instant invention and a flexible disk held in position, with several parts of the device removed.
Figure 2:
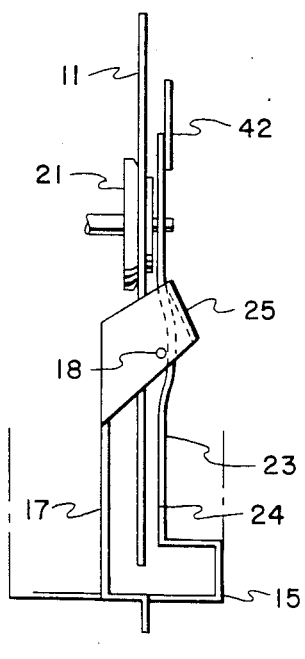
FIG. 2 shows a fragmentary plan of the device illustrated in FIG. 1, together with a flexible disk held in position.
Figure 3:
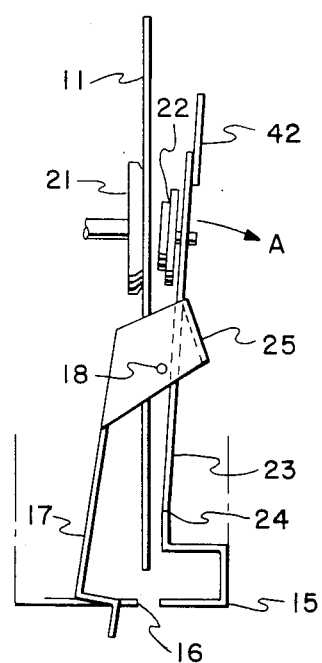
FIG. 3 shows another fragmentary plane of the device with a handle member actuated, together with a flexible disk.

Referring to FIGS. 1 through 3, a flexible disk device according to an embodiment of the present invention is for operatively dealing with a flexible or floppy disk which is encased in a rectangular case 11 of a flexible material, such as paper. The flexible disk has first and second principal surfaces, along each of which data may retrievably be stored. The case 11 has a center hole 12 and an offset hole 13 on each side of the encased flexible disk. The offset holes 13 are symmetric with respect to each other on both sides of the flexible disk and are elongated radially of the flexible disk. The holes 12 and 13 are for the purposes which will become clear as the description proceeds. It may be mentioned here that the flexible disk also has a center hole concentrically of the center holes 12 of the case 11. Inasmuch as kept encased, the flexible disk will hereafter be designated by the reference numeral 11.

The flexible disk device comprises a frame 15 having a slot 16. A manually operable handle or door member 17 is attached to the frame 15 so as to be swingable on a door axis 18. The handle member 17 is illustrated in FIGS. 1 and 2 in a first operated position of covering the slot 16. The handle member 17 is depicted in FIG. 3 in a second operated position for exposing the slot 16, through which a flexible disk 11 can manually be put into the flexible disk device and taken out thereof. The frame 15 preferably comprises a pair of rails (not shown) perpendicularly of the slot 16 for guiding the flexible disk 11 into and out of the flexible disk device.

A holding assembly comprises a spingle 21 and a collet 22. The spindle 21 is mounted on the frame 15 and is controllably rotatable by a motor (not shown) on a spindle axis. As will presently be described in detail, the spindle 21 and the collet 22 disengageably engage with each other through the center hole of a flexible disk 11 guided in the flexible disk device approximately to an optimum position where the center hole of the disk 11 becomes coaxial with the spindle axis.

By means of the spindle 21 and the collet 22, the holding assembly releasably holds a flexible disk 11 in position in the manner outlined in FIG. 2. When held in position, the disk 11 has the first and the second principal surfaces on one and the other side of a predetermined plane. It is possible to understand that the predetermined plane is specific to the frame 15 and is had by the flexible disk device. Merely for convenience of description, the sides of the predetermined plane on which the collet 22 and the spindle 21 are depicted in FIG. 3, will be referred to, for the time being, as first and second sides, respectively.

The handle member 17 comprises a resilient sheet 23 on the first side of the predetermined plane. The resilient sheet 23 has an edge 24 hingedly fixed to the frame 15. The collet 22 is carried by the resilient sheet 23, which may therefore be named a collet holding sheet. The handle member 17 furthermore comprises a coupling arm 25 in linear contact with the collet holding sheet 23. It is now understood that the handle member 17 has at least a portion thereof on the first side of the predetermined plane.

When the handle member 17 is put in the first operated position illustrated in FIGS. 1 and 2, the coupling arm 25 pushes the collet holding sheet 23 towards the predetermined plane against the resiliency thereof. The collet 22 engages with the spindle 21 so that a flexible disk 11 guided approximately to the optimum position, may be held in position. It is preferred that the handle member 17 is designed to rest in the first operated position. Moreover, the door axis 18 is preferably given by a door axle extended parallel to the predetermined plane so that the collet holding sheet 23 may be urged by the coupling arm 25 towards the predetermined plane with the door axle used as a fulcrum as exaggeratedly depicted in FIG. 2.

When the handle member 17 is operated towards the second operated position shown in FIG. 3, the coupling arm 25 allows the collet holding sheet 23 to move away from the predetermined plane by the resiliency. The collet 22 moves clockwise in FIG. 3 as indicated by an arrow A. The collet 22 disengages from the spindle 21 so that a flexible disk 11 may freely be guided towards and away from the optimum position.

Figure 4:
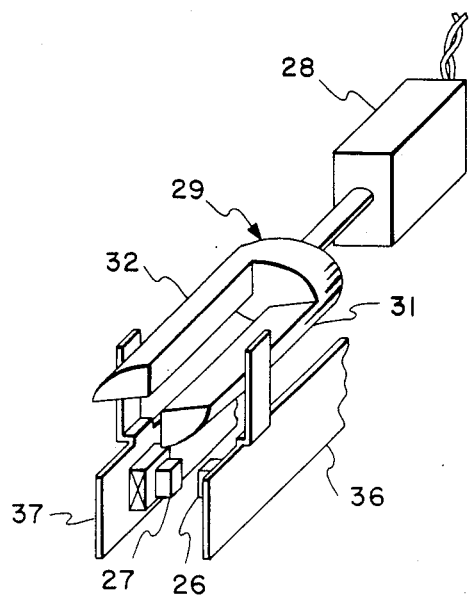
FIG. 4 is a perspective view of a pair of magnetic heads and a cam mechanism of the device shown in FIG. 1.

Referring now to FIG. 4, the flexible disk device comprises first and second magnetic heads 26 and 27 in alignment with each other on the first and the second sides of the predetermined plane, respectively. As will shortly be described in detail, the first and the second magnetic heads 26 and 27 can controllably be brought into contact with the respective principal surfaces of a flexible disk 11 held in position through the respective offset holes 13 (FIG. 1) when it is desired to use either of the magnetic heads 26 and 27 in writing new data along a track on a selected one of the first and the second principal surfaces of the disk 11, reading the memorized data, or rewriting such data. It will hereinafter be presumed merely for brevity of description that a flexible disk 11 is held in position unless otherwise specified.

Figure 5:
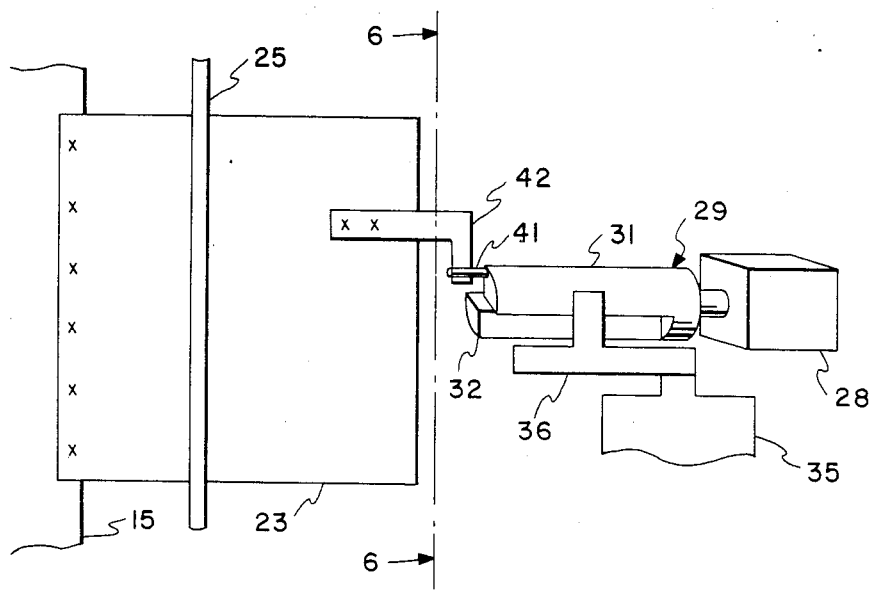
FIG. 5 is a schematic front view of a principal part of a flexible disk device according to a more preferred embodiment of this invention.
Figures 6, 7:
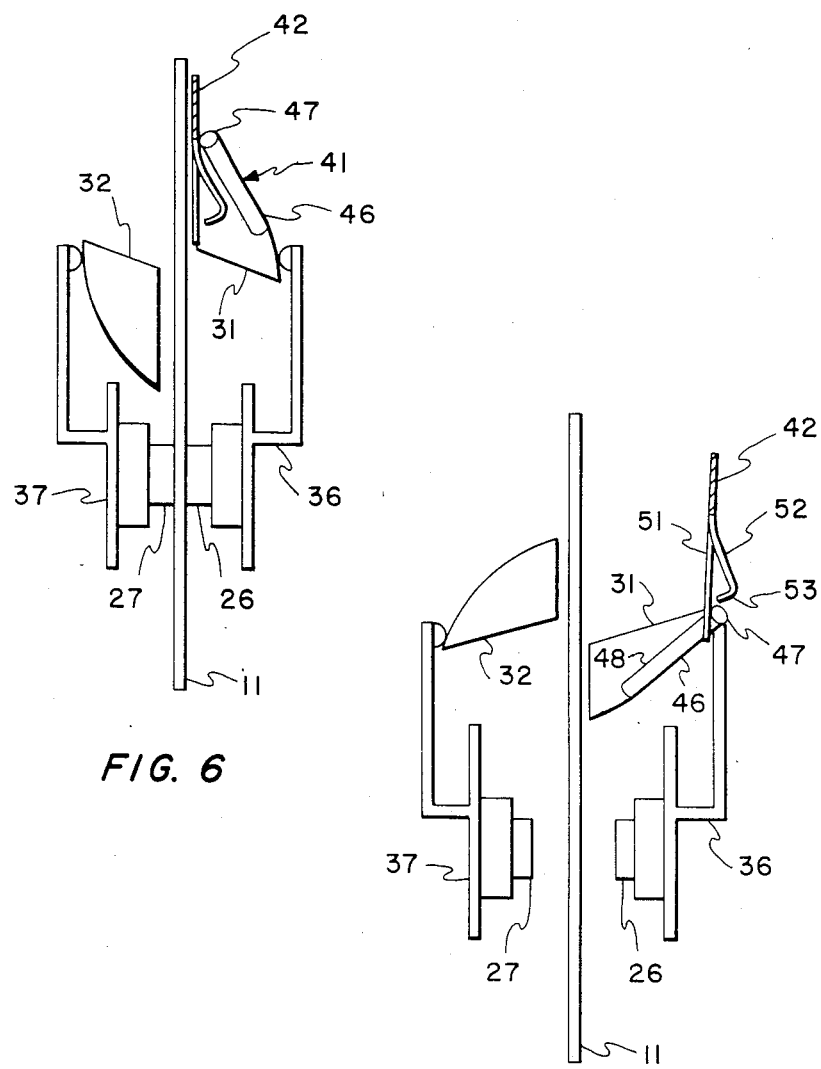
FIG. 6 shows a side view of the principal part which is seen as indicated in FIG. 5 by a line 6—6, together with a flexible disk held in position.
FIG. 7 is another side view similar to FIG. 6.

Referring additionally to FIGS. 5 through 7 for a short while, a driving member 28 is for rotating a cam 29, selectively, between first and second angular positions on an axis of rotation which lies on the predetermined plane. The driving member 28 may either be a motor or a rotary solenoid. In the example being illustrated, the cam 29 is reversibly rotated. More specifically, the cam 29 is rotated selectively from the first angular position to the second angular position forwardly along a predetermined path and from the second angular position to the first angular position reversedly along the predetermined path.

The cam 29 comprises a cam stem and first and second cam sections 31 and 32. Each of the cam sections 31 and 32 has first and second ends. The first ends of the respective cam sections 31 and 32 are rendered integral with the cam stem. For the time being, the second ends are free ends. The first and the second cam sections 31 and 32 have first and second cam surfaces, respectively. It should be understood for convenience of the following description that the cam stem may comprise first and second leg portions, which do not have the first and the second cam surfaces, respectively. Such leg portions should be placed away from the flexible disk 11 on both sides thereof, while a solid body of the cam stem should be situated away from the disk 11 along the predetermined plane. The first and the second cam surfaces should have an axis of symmetry which is coincident with the axis of rotation. The cam surfaces should be shaped as will later be discussed in detail.

The cam 29 is mounted on the frame 15 (FIGS. 1 through 3) so that the cam stem is offset as described above from the flexible disk 11 and that the first and the second cam sections 31 and 32 are rotatable around the axis of rotation with the disk 11 interposed when the cam 29 is rotated between the first and the second angular positions. During the rotation, the first and the second cam sections 31 and 32 are always on the first and the second sides of the predetermined plane, respectively. Consequently, the first and the second cam surfaces are moved in the meanwhile on the first and the second sides, respectively. The driving member 28 is mounted on the frame 15 also out of the position for the disk 11.

A carriage 35 is mounted on the frame 15 so as to controllably slide parallel to the axis of rotation in a range positioned away from the flexible disk 11. Each of first and second head holders 36 and 37 has first and second ends. The first ends of the respective head holders 36 and 37 are carried by the carriage 35 so that each of the head holders 36 and 37 may serve as a cam follower. It will temporarily be assumed that the head holders 36 and 37 always follow the first and the second cam surfaces, respectively. The first and the second magnetic heads 26 and 27 are attached to the second ends of the first and the second head holders 36 and 37, respectively.

When the cam 29 is put in the first angular position (FIG. 6), the first and the second magnetic heads 26 and 27 are brought into sliding contact with those principal surfaces of the flexible disk 11 which are disposed on the first and the second sides of the predetermined plane, respectively. When the cam 29 is put in the second angular position (FIG. 7), the heads 26 and 27 are withdrawn or retracted away from the disk 11 or the predetermined plane. The heads 26 and 27 are simultaneously moved towards and away from the predetermined plane without complicated parts and troublesome adjustment of such parts. It is now understood that the head holders 36 and 37 are preferably resilient to urge the respective magnetic heads 26 and 27 towards the predetermined plane and that a narrow gap may be left between each of the cam surface and the associated one of the head holders 36 and 37 when the heads 26 and 27 are urged towards the respective principal surfaces of the disk 11.

Referring more particularly to FIGS. 6 and 7, the first and the second cam surfaces are preferably shaped so as to make the first and the second head holders 36 and 37 move the first and the second magnetic heads 26 and 27 with a decreasing speed towards one and the other of the first and second principal surfaces of the flexible disk 11 when the cam 29 is rotated from the second angular position towards the first angular position. It is possible with this to avoid the necessity of dampers or a like expensive part for decelarating the heads 26 and 27 on bringing the heads 26 and 27 into contact with the respective principal surfaces. Furthermore, time consuming adjustment of the expensive part is rendered no longer mandatory on manufacturing such flexible disk devices. It is more preferable for the heads 26 and 27 to be continuously and uniformly decelerated.

By way of example, the first and the second cam sections 31 and 32 are first and second sectors of a cam-surface-defining cylinder having a substantially elliptic orthogonal cross-section. Each sector may be called either a sector-shaped cylinder or a cylindrical prism. Each sector-shaped cylinder has first and second planar side surfaces and a cylindrical side surface. The cylindrical side surfaces of the first and the second sector-shaped cylinders are the first and the second cam surfaces, respectively. Such sector-shaped cylinders should be rendered integral with the cam stem with an axis of symmetry placed coincident with the axis of rotation.

It may be mentioned here that that angle of reversible rotation of the cam stem or the cam 29 which is formed between the first and the second angular positions (FIGS. 6 and 7) may be between about 70° and 90°. The predetermined path described heretofore is defined by the angle of rotation. A vertical angle subtended by each of the cam surfaces may be complementary to the angle of rotation and consequently between about 130° and 90°. When the cam 29 is put in the first angular position (FIG. 6), the first planar sides of the first and the second sector-shaped cylinders are disposed parallel to the predetermined plane. When the cam 29 is put in the second angular position (FIG. 7), the second planar sides of the sector-shaped cylinders are placed parallel to the predetermined plane.

The substantially elliptic orthogonal cross-section may have the form of a single ellipse. The first planar side surfaces of the first and the second sector-shaped cylinders should be parallel to the major axis. When the cam 29 is put in the first angular position (FIG. 6), the first and the second head holders 36 and 37 are either in contact with or adjacent to the respective cam surfaces at both ends of the minor axis. When the cam 29 is put in the second angular position (FIG. 7), the head holders 36 and 37 are in contact with the respective cam surfaces near both ends of the major axis.

The substantially elliptic orthogonal cross-section may alternatively be outlined for the first and the second cam surfaces by first and second ellipses, respectively. The first and the second ellipses should be identical with each other and have an axis of symmetry on the axis of rotation. Each of the first and the second ellipses has the center preferably at a position which is not much spaced apart from the axis of rotation as compared with the major or the minor axis, particularly when it is desired to appreciably move the heads 26 and 27 towards and away from the predetermined plane on bringing the heads 26 and 27 into contact with the disk 11 and out of contact therewith. The axis of rotation may either be nearer to or farther from the first and the second cam surfaces than the centers of the first and the second ellipses, respectively. The first planar side surfaces of the respective sector-shaped cylinders may include the major axes of the respective ellipses. When the cam 29 is put in the first angular position, each head holder 36 or 37 is either in contact with or adjacent to the associated one of the cam surfaces at one end of the minor axis of the related ellipse. When the cam 29 is put in the second angular position, the head holder 36 or 37 is in contact with the cam surface at one end of the major axis.

Figure 8:
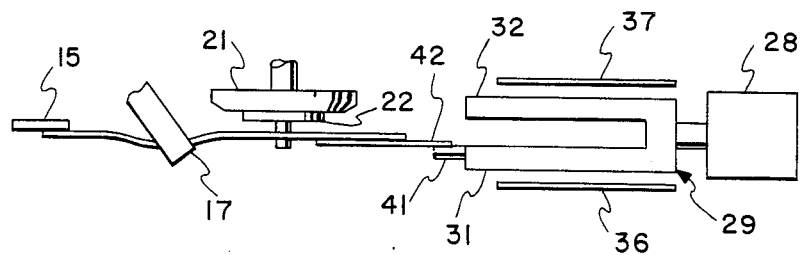
FIG. 8 shows a schematic plan of the principal part illustrated in FIG. 5.

Referring once again to FIGS. 1 through 7 and afresh to FIG. 8, a flexible disk device according to a more preferred embodiment of this invention comprises similar parts designated by like reference numerals. The flexible disk device additionally comprises a head withdrawing assembly for forcibly withdrawing the first and the second magnetic heads 26 and 27 away from the predetermined plane whenever the handle member 17 is inadvertently actuated from the first operated position towards the second operated position to undesiredly release the flexible disk 11 during the time that the heads 26 and 27 are kept in sliding contact with the respective principal surfaces of the disk 11.

The head withdrawing assembly comprises a protrusion 41 attached to the second end of the first cam section 31 to be movable together therewith on the first side of the predetermined plane generally towards and away from the predetermined plane and an extension arm 42 attached to the collet holding sheet 23 of the handle member 17 to be movable together with the sheet 23 also on the first side towards and away from the predetermined plane.

The extension arm 42 is positioned relative to the protrusion 41 so as to leave the protrusion 41 freely reversibly movable when the handle member 17 is kept in the first operated position. The extension arm 42 pushes the protrusion 41 away from the predetermined plane to forcibly rotate the cam stem or the cam 29 through the first cam section 31 from the first angular position (FIGS. 5, 6, and 8) towards the second angular position (FIG. 7) whenever the handle member 17 is actuated from the first operated position towards the second operated position. The extension arm 42 is left in a position depicted in FIG. 6 without coming into contact with the protrusion 41 while the handle member 17 is kept in the first operated position even if the cam 29 is rotated to the second angular position depicted in FIG. 7.

As will readily be understood, it is unnecessary that the protrusion 41 and the extension arm 42 be colinearly extended. It is only necessary that a tip of the extension arm 42 be operable as described above to push the protrusion 41 away from the predetermined plane whenever the handle member 17 is moved from the first operated position towards the second operated position.

Figure 9:
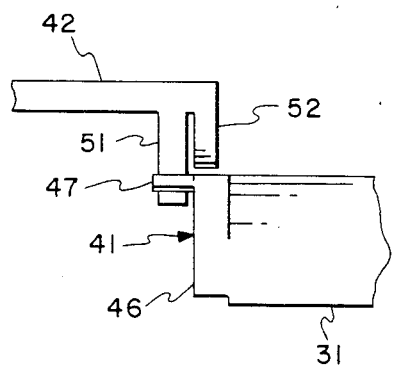
FIG. 9 is a detailed front view of a head withdrawing assembly used in a flexible disk device according to a still more preferred embodiment of this invention.

Referring now to FIG. 9 together with FIGS. 6 and 7, a flexible disk device according to a still more preferred embodiment of this invention again comprises similar parts designated by like reference numerals. The protrusion 41 comprises first and second extensions 46 and 47. The first extension 46 is extended parallel to the axis of rotation from the second end of the first cam section 31 and has an operating surface 48 (FIG. 7) directed generally towards the predetermined plane specifically when the cam stem or the cam 29 is put in the first (FIG. 6) angular position. The second extension 47 is farther extended from the first extension 46 parallel to the axis of rotation.

The extension arm 42 has first and second projections 51 and 52. As best shown in FIGS. 6 and 7, the first projection 51 is projected from the extension arm 42 substantially parallel to the predetermined plane. As would best be understood from FIG. 6, the second projection 52 is projected also from the extension arm 42 substantially parallel to the operating surface 48 when the cam stem is put in the first angular position.

So long as the handle member 17 remains in the first operated position, the first and the second projections 51 and 52 are kept away from the first and the second extensions 46 and 47 as described hereinabove in connection with the extension arm 42 with reference to FIGS. 1 through 8 even when the cam stem or the cam 29 is put in whichever of the first and the second angular positions.

The first and the second projections 51 and 52 are projected from the extension arm 42 relative to the first and the second extensions 46 and 47 so that the second projection 52 pushes the operating surface 48 at first whenever the handle member 17 is moved from the first operated position towards the second operated position. Being pushed at the operating surface 48, the first extension 46 forcibly rotates the cam stem or the cam 29 from the first angular position towards the second angular position together with the second extension 47. When the cam 29 is rotated about 70°, namely, nearly the angle of reversible rotation, the second extension 47 comes out of contact with the second projection 52. The cam 29 is thus rotated eventually to the second angular position, when the first projection 51 comes into contact with the second extension 47.

The second projection 52 preferably has a resilient end 53 bent towards the predetermined plane. The resilient end 53 is for assisting coming off of the second extension 47 from the second projection 52 and also coming into contact of the former with the first projection 51.

Referring back to FIG. 4, the cam 29 may not specifically comprise the first and the second cam sections 31 and 32. In other words, the cam 29 may be a single solid cam having the first and the second cam surfaces. The solid cam should be mounted on the frame 15 (FIGS. 1 through 3) wholly out of the position for the flexible disk 11 by using longer head holders 36 and 37. In this event, it is possible to rotate the cam only in a selected one of clockwise and counterclockwise senses. During one complete revolution in the selected sense, the cam may more than twice be put in each of the first and the second angular positions.

The solid cam may reversibly be rotated between the first and the second angular positions. It is possible under the circumstances to furnish the flexible disk device with the head withdrawing assembly described either with reference to FIGS. 5 through 8 or with reference to FIGS. 5 through 9. The protrusion 41 should be rendered integral with that portion of the solid cam which is reversibly moved only on the first side of the predetermined plane.

While a few preferred embodiments of this invention have thus far been described, it will now readily be possible for one skilled in the art to carry this invention into effect in various other manners. For example, the collet holding sheet 23 may be regarded as a part of the holding assembly comprising the spindle 21 and the collet 22. In this event, the head withdrawing assembly should be coupled to the holding assembly rather than to the handle member 17. The modification is, however, equivalent to the embodiments described heretobefore. The first and the second sides of the predetermined plane may be the sides on which the spindle 21 and the collet 22 are positioned in FIG. 3, respectively. It is necessary in this case that the head withdrawing assembly, if provided, be coupled to the handle member 17 in a position which would not disturb free operation of the holding assembly. It is also possible to form the first and the second cam sections 31 and 32 as to substantially elliptic cylinders particularly when a small movement of the head holders 36 and 37 towards and away from the predetermined plane is sufficient to couple and decouple the magnetic heads 26 and 27 relative to the flexible disk 11 held in position. Moreover, the elliptic cylinders may be rotated in this event on their respective cylindrical axes although the arrangement does not come within the scope of the flexible disk device set forth before the brief description of the drawing.

What is claimed is:

1. A flexible disk device which has a predetermined plane having first and second sides and which comprises:

holding means for releasably holding a flexible disk having a pair of principal surfaces with said principal surfaces positioned on said first and said second sides, respectively;

a handle member which is coupled to move said holding means and which is manually operable between first and second operated positions to selectively cause said holding means to hold and release the flexible disk when said handle member is put into said first and said second operated positions, respectively;

first and second magnetic heads in alignement with each other and positioned adjacent said first and said second sides, respectively;

first and second head holders for carrying and supporting said first and said second magnetic heads, respectively;

a cam having a cam surface between said first and said second head holders and being selectively rotatable from a first angular position to a second angular position and from said second angular position to said first angular position on an axis of rotation lying on said predetermined plane, said cam surface being positioned for simultaneously and gently bringing said first and said second head holders into locations which simultaneously place said first and said second magnetic heads at decreasing speed n contact with the respective principal surfaces of the flexible disk held by said holding means and simultaneously withdraw said first and said second magnetic heads away from said predetermined plane responsive to said cam being put into said first and said second angular positions, respectively;

said cam surface further being divided into first and second cam surfaces having an axis of symmetry coincident with said axis of rotation;

said cam comprising:

a cam stem which is offset from the flexible disk, said cam stem being held by said holding means and being rotatable on said axis of rotation, selectively, from said first angular position to said second angular position with the rotation being forwardly along a predetermined path and from said second angular position to said first angular position with the rotation being reversed along said predetermined path;

first and second cam sections having said first and said second cam surfaces, respectively, said cam sections being integral with said cam stem, so that said cam sections are reversibly rotatable around said axis of rotation only adjacent said first and said second sides, respectively, when said cam stem is rotated reversibly between said first and said second angular positions; and head withdrawing means coupled to said handle member adjacent said first side and to said first cam section to leave said cam stem freely and reversibly rotatable between said first and said second angular positions when said handle member is put in said first operated position and to forcibly rotate said cam stem through said first cam section from said first angular position towards said second angular position to make said first and said second head holders simultaneously withdraw said first and said second magnetic heads away from said predetermined plane whenever said handle member is moved from said first operated position towards said second operated position.

2. A flexible disk device as claimed in claim 1, wherein said head withdrawing means comprises:

a protrusion attached to said first cam section to be movable together with said first cam section adjacent said first side of said predetermined plane; and an extension arm attached to said handle member to be movable adjacent said first side of said predetermined plane and to be placed relative to said protrusion so as to leave said protrusion freely movable when said handle member is put into said first operated position and so as to push said protrusion thereby to forcibly rotate said cam stem through said first cam section from said first angular position towards said second angular position whenever said handle member is moved from said first operated position towards said second operated position.

3. A flexible disk device as claimed in claim 2, wherein:

said protrusion comprises first and second extensions extended from said first cam section and from said first extension parallel to said axis of rotation, respectively, said first extension having an operating surface directed towards said predetermined plane when said cam stem is positioned in said first angular position;

said extension arm having first and second projections, said first projection projecting from said extension arm substantially parallel to said predetermined plane, said second projection projecting from said extension arm substantially parallel to said operating surface when said cam stem is put in said first angular position, said first and said second projections projecting from said extension arm relative to said first and said second extensions so that, whenever said handle member is moved from said first operated position towards said second operated position, said second projection pushes said operating surface to forcibly rotate said cam stem, together with said second extension, through said first extension and said first cam section from said first angular position towards said second angular position until said first projection comes into contact with said second extension.

4. A flexible disk device as claimed in claim 1, wherein said first and said second cam sections are first and second sector-shaped cylinders which are identical with each other and have an axis of symmetry coincident with said axis of rotation, each of said sector-shaped cylinders having first and second planar side surfaces and a cylindrical side surface, the first planar side surfaces of said first and said second sector-shaped cylinders being disposed substantially parallel to said predetermined plane when said cam stem is put in said first angular position, the second planar side surfaces of said first and said second sector-shaped cylinders being disposed substantially parallel to said predetermined plane when said cam stem is put in said second angular positin, the cylindrical side surfaces of said first and said second sector-shaped cylinders being said first and said second cam surfaces, respectively.

5. A flexible disk device as claimed in claim 2, wherein said first and said second cam sections are first and second sector-shaped cylinders which are identical with each other and have an axis of symmetry coincident with said axis of rotation, each of said sector-shaped cylinders having first and second planar side surfaces and a cylindrical side surface, the first planar side surfaces of said first and said second sector-shaped cylinders being disposed substantially parallel to said predetermined plane when said cam stem is put in said first angular position, the second planar side surfaces of said first and said second sector-shaped cylinders being disposed substantially parallel to said predetermined plane when said cam stem is put in said second angular positin, the cylindrical side surfaces of said first and said second sector-shaped cylinders being said first and said second cam surfaces, respectively.

6. A flexibe disk device as claimed in claim 3, wherein said first and said second cam sections are first and second sector-shaped cylinders which are identical with each other and have an axis of symmetry coincident with said axis of rotation, each of said sector-shaped cylinders having first and second planar side surfaces and a cylindrical side surface, the first planar side surfaces of said first and said second sector-shaped cylinders being disposed substantially parallel to said predetermined plane when said cam stem is put in said first angular position, the second planar side surfaces of said first and said second sector-shaped cylinders being disposed substantially parallel to said predetermined plane when said cam stem is put in said second angular positin, the cylindrical side surfaces of said first and said second sector-shaped cylinders being said first and said second cam surfaces, respectively.

7. A flexible disk device which has a predetermined plane having first and second sides and which comprises:

holding means for releasably holding a flexible disk having a pair of principal surfaces with said principal surfaces positioned on said first and said second sides, respectively;

a handle member which is coupled to move said holding means and which is manually operable between first and second operated positions to selectively cause said holding means to hold and release the flexible disk when said handle member is put into said first and said second operated positions, respectively;

first and second magnetic heads in alignment with each other and positioned adjacent said first and said second sides, respectively;

first and second head holders for carrying and supporting said first and said second magnetic heads, respectively;

a cam having a cam surface between said first and said second head holders and being selectively rotatable from a first angular position to a second angular position and from said second angular position to said first angular position on an axis of rotation lying on said predetermined plane, said cam surface being positioned for simultaneously and gently bringing said first and said second head holders into locations which simultaneously place said first and said second magnetic heads at decreasing speed in contact with the respective principal surfaces of the flexible disk held by said holding means and simultaneously withdraw said first and said second magnetic heads away from said predetermined plane responsive to said cam being put into said first and said second angular positions, respectively, said cam being rotatable on said axis of rotation selectively from said first angular position to said second angular position with the rotation being forwardly directed along a predetermined path and from said second angular position to said first angular position with the rotation being reversedly directed along said predetermined path with said first and said second cam surfaces being moved adjacent said first and said second sides of said predetermined plane, respectively; and said flexible disk device further comprising head withdrawing means coupled to said first side of said handle member and to said cam to leave said cam freely and reversibly rotatable between said first and said second angular positions when said handle member is put into said first operated position and to forcibly rotate said cam from said first angular position towards said second angular position to make said first and said second head holders simultaneously withdraw said first and said second magnetic heads away from said predetermined plane whenever said handle member is moved from said first operated position towards said second operated position.

8. A flexible disk device as claimed in claim 7, wherein said head withdrawing means comprises:
  a protrusion attached to said cam to be movable together with said cam always adjacent said first side of said predetermined plane; and
  an extension arm attached to said handle member to be movable always adjacent said first side of said predetermined plane and placed relative to said protrusion so as to leave said protrusion freely movable when said handle member is put in said first operated position and so as to push said protrusion thereby to forcibly rotate said cam from said first angular position towards said second angular position whenever said handle member is moved from said first operated position towards said second operated position.

9. A flexible disk device as claimed in claim 8, wherein:
  said protrusion comprises first and second extensions extended from said cam and from said first extension parallel to said axis of rotation, respectively, said first extension having an operating surface directed towards said predetermined plane when said cam is put in said first angular position;
  said extension arm having first and second projections, said first projection projecting from said extension arm substantially parallel to said predetermined plane, said second projection projecting from said extension arm substantially parallel to said operating surface when said cam is put in said first angular position, said first and said second projections projecting from said extension arm relative to said first and said second extensions so that, whenever said handle member is moved from said first operated position towards said second operated position, said second projection pushes said operating surface to forcibly rotate said cam, together with said second extension, through said frist extension from said first angular position towards said second angular position until said first projection comes into contact with said second extension.

10. A flexible disk device as claimed in claim 7, wherein said first and said second cam surfaces are those surface portions of a cylinder having a substantially elliptic orthogonal cross section.

11. A flexible disk device as claimed in claim 10, wherein said cross section is of a form of an ellipse.

* * * * *